US010826345B2

(12) United States Patent
Huang et al.

(10) Patent No.: US 10,826,345 B2
(45) Date of Patent: Nov. 3, 2020

(54) CONDUCTOR AND METHOD OF FORMING THEREOF

(71) Applicant: GE AVIATION SYSTEMS LLC, Grand Rapids, MI (US)

(72) Inventors: Hao Huang, Troy, OH (US); Wei Zhang, Ballston Lake, NY (US); Xiaochuan Jia, Centerville, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 249 days.

(21) Appl. No.: 15/606,123

(22) Filed: May 26, 2017

(65) Prior Publication Data
US 2018/0342919 A1    Nov. 29, 2018

(51) Int. Cl.
*H02K 3/22*  (2006.01)
*H02K 15/06*  (2006.01)
*H02K 7/18*  (2006.01)

(52) U.S. Cl.
CPC .............. *H02K 3/22* (2013.01); *H02K 7/1823* (2013.01); *H02K 15/06* (2013.01); *H02K 2209/00* (2013.01)

(58) Field of Classification Search
CPC ........ H02K 3/22; H02K 7/1823; H02K 15/06; H02K 2209/00
See application file for complete search history.

(56) References Cited

U.S. PATENT DOCUMENTS

| 1,370,156 | A | * | 3/1921 | Rudenberg | H02K 3/22 310/64 |
| 2,727,161 | A | * | 12/1955 | Kilner | H02K 3/22 310/64 |
| 2,763,794 | A | * | 9/1956 | Baudry | H02K 9/005 310/55 |
| 2,780,739 | A | * | 2/1957 | Baudry | H02K 3/24 310/55 |
| 2,791,707 | A | * | 5/1957 | Willyoung | H02K 3/24 310/61 |
| 2,898,484 | A | * | 8/1959 | Krastchew | H02K 3/24 310/52 |
| 2,917,644 | A | * | 12/1959 | Laffoon | H02K 3/24 310/64 |
| 2,920,218 | A | * | 1/1960 | Beckwith | H02K 9/005 310/55 |
| 3,014,139 | A |  | 12/1961 | Shildneck | |

(Continued)

FOREIGN PATENT DOCUMENTS

CN  104625072 A  5/2015
CN  205039638 U  2/2016

(Continued)

OTHER PUBLICATIONS

Chinese Patent Office, Office Action re Chinese Patent Application No. 201810513577.0, dated Dec. 13, 2019, 12 pages, China.

*Primary Examiner* — Mohamad A Musleh
(74) *Attorney, Agent, or Firm* — McGarry Bair PC

(57) ABSTRACT

A conductor a method of forming a conductor can include providing a hollow base conductor defining a fluid channel along the base conductor, and a solid conductor arranged about the perimeter of the hollow base conductor, wherein the fluid channel can be configured to allow a fluid to flow via the channel.

19 Claims, 8 Drawing Sheets

(56) References Cited

U.S. PATENT DOCUMENTS

| | | | |
|---|---|---|---|
| 3,597,645 A | | 8/1971 | Duffert et al. |
| 7,538,457 B2 | | 5/2009 | Holmes et al. |
| 2014/0159518 A1 | * | 6/2014 | Haldemann .............. H02K 3/14 |
| | | | 310/59 |
| 2015/0165495 A1 | * | 6/2015 | Yon, III ................... H02K 3/22 |
| | | | 134/7 |
| 2015/0171687 A1 | * | 6/2015 | Koyama .................. B23K 1/20 |
| | | | 310/54 |

FOREIGN PATENT DOCUMENTS

| | | | | |
|---|---|---|---|---|
| DE | 10059385 A1 | * | 6/2002 | ............. H02K 3/24 |
| EP | 0175083 A1 | * | 3/1986 | ............. H02K 3/22 |
| GB | 459729 A | * | 1/1937 | ............. H02K 3/24 |
| GB | 777468 A | * | 6/1957 | ............. H02K 3/24 |
| GB | 779050 A | * | 7/1957 | ............. H02K 3/24 |
| GB | 860931 A | * | 2/1961 | ............. H02K 3/22 |
| GB | 866746 A | * | 4/1961 | ............. H02K 3/22 |
| GB | 892858 | | 4/1962 | |
| GB | 892858 A | * | 4/1962 | ............. H02K 3/14 |
| GB | 1031786 A | | 6/1966 | |
| GB | 1091944 A | * | 11/1967 | ............. H02K 3/22 |
| JP | 2009254027 A | | 10/2009 | |

\* cited by examiner

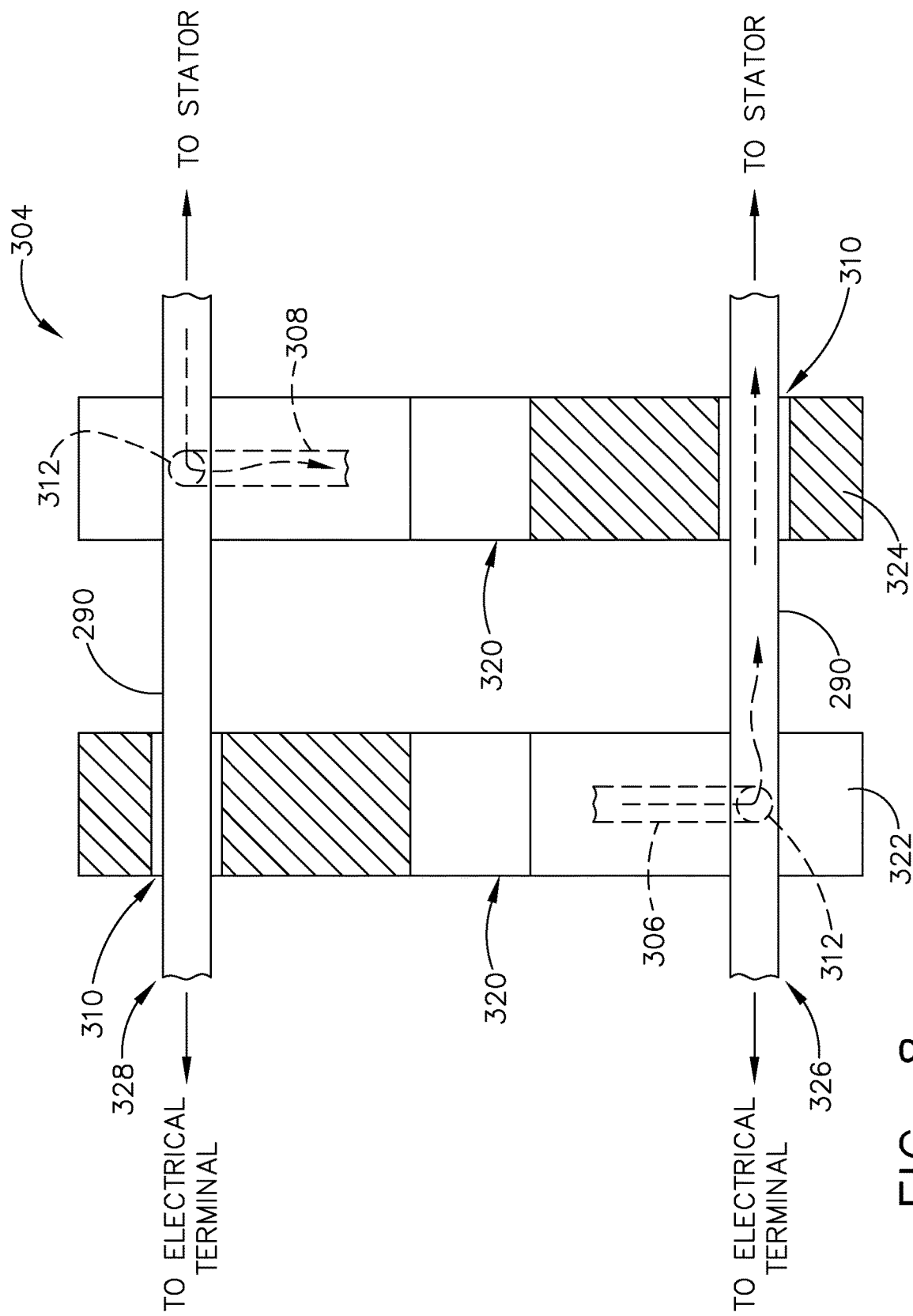

US 10,826,345 B2

CONDUCTOR AND METHOD OF FORMING THEREOF

BACKGROUND OF THE INVENTION

Future aircraft can request large amounts of power, such as generators capable of providing or generating MegaWatts of power, to provide electrical energy to power systems on the aircraft, or power large electrical loads, such as motors. In one example, the motors can drive an engine low spool shaft or a high spool shaft of an aircraft engine, or to drive other movers, such as boundary layer ingestion fans. In such examples, the electric machine can include better cooling capabilities than either conventional dry cavity method or conventional wet cavity cooling methods.

BRIEF DESCRIPTION OF THE INVENTION

In one aspect, the present disclosure relates to a conductor, including a hollow base conductor defining a fluid channel along the base conductor, and a set of solid conductors arranged about a perimeter of the hollow base conductor.

In another aspect, the present disclosure relates to a set of windings for an electric machine, including a polygonal cross-sectional base conductor having a set of sidewalls defining a fluid channel, and a set of polygonal cross-sectional solid conductors arranged about a perimeter of the base conductor and thermally connected with the base conductor.

In yet another aspect, the present disclosure relates to a method of forming a set of electric machine windings, the method including forming a polygonal cross-sectional base conductor having a set of sidewalls defining a fluid channel, and arranging a set of polygonal cross-sectional solid conductors about a perimeter of the base conductor, wherein the set of solid conductors are thermally connected with the base conductor.

BRIEF DESCRIPTION OF THE DRAWINGS

In the drawings:

FIG. 8 is a schematic view of the stator windings of the generator of FIG. 6 and a cooling system, in accordance with various aspects described herein.

DESCRIPTION OF EMBODIMENTS OF THE INVENTION

Figure 1:
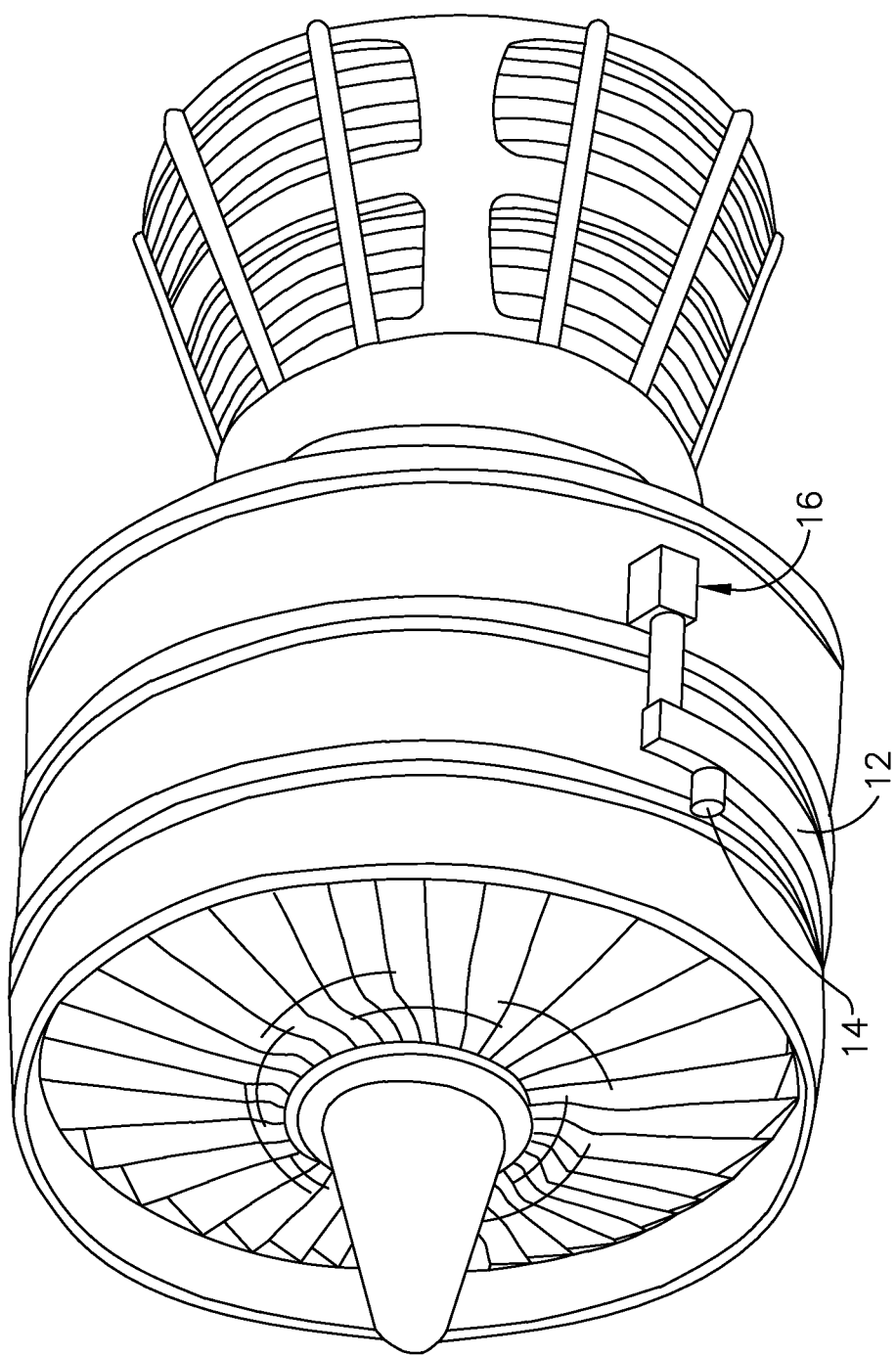
FIG. 1 is a perspective view of a gas turbine engine having a generator in accordance with various aspects described herein.

Aspects of the disclosure can be implemented in any environment, apparatus, or method for cooling a set of conductors, conductive wires, or conductive windings, for example, in a generator, a motor, or the like.

While "a set of" various elements will be described, it will be understood that "a set" can include any number of the respective elements, including only one element. As used herein, the terms "axial" or "axially" refer to a dimension along a longitudinal axis of the generator or along a longitudinal axis of a component disposed within the generator, such as a rotor. As used herein, the terms "radial" or "radially" refer to a dimension extending between a center longitudinal axis of the generator, an outer circumference, or a circular or annular component disposed within the generator. The use of the terms "proximal" or "proximally" refers to a component being relatively closer to a referential element as compared to another component. The term "forward" used in conjunction with "axial" or "axially" refers to moving in a direction toward the engine inlet, or a component being relatively closer to the engine inlet as compared to another component. The term "aft" used in conjunction with "axial" or "axially" refers to a direction toward the rear or outlet of the engine relative to the engine centerline.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other.

While terms such as "voltage", "current", and "power" can be used herein, it will be evident to one skilled in the art that these terms can be interchangeable when describing aspects of the electrical circuit, or circuit operations. The exemplary drawings are for purposes of illustration only and the dimensions, positions, order and relative sizes reflected in the drawings attached hereto can vary.

FIG. 1 illustrates a gas turbine engine 10 having an accessory gear box (AGB) 12 and a generator 14 according to one aspect of the disclosure. The AGB 12 can be mechanically coupled to a turbine shaft (not shown) of the gas turbine engine 10 by way of a mechanical power take off 16. The gas turbine engine 10 can be any suitable gas turbine engine used in modern commercial and military aviation or it could be a variety of other known gas turbine engines such as a turboprop or turboshaft. The type and specifics of the gas turbine engine 10 are not germane to the disclosure and will not be described further herein. While a generator 14 is described, aspects of the disclosure can be included a generator, motor, or any conductor, conductive wire, or set of conductive windings utilized for commercial or residential implements.

Figure 2:
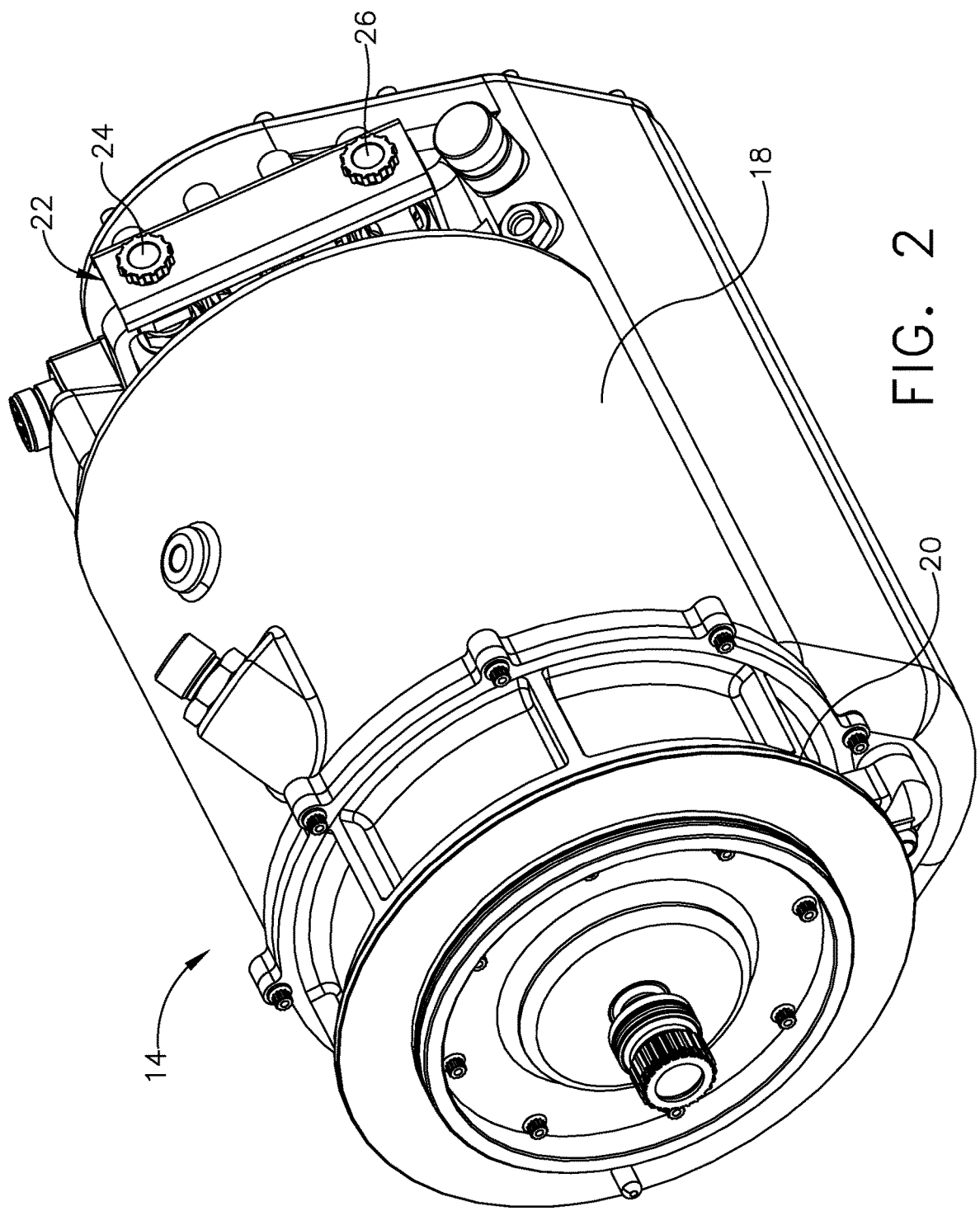
FIG. 2 is a perspective view of an exterior of the generator of FIG. 1, in accordance with various aspects described herein.

FIG. 2 more clearly illustrates a non-limiting example of the generator 14 and its housing 18, which can include a clamping interface 20, used to clamp the generator 14 to the AGB 12. Multiple electrical connections can be provided on the exterior of the generator 14 to provide for the transfer of electrical power to and from the generator 14. The electrical connections can include a first power connector assembly 22 having electrical power connections 24 and 26, which can be connected by cables to an electrical power distribution node of an aircraft having the gas turbine engine 10 to power various items on the aircraft, such as lights and seat-back monitors.

Figure 3:
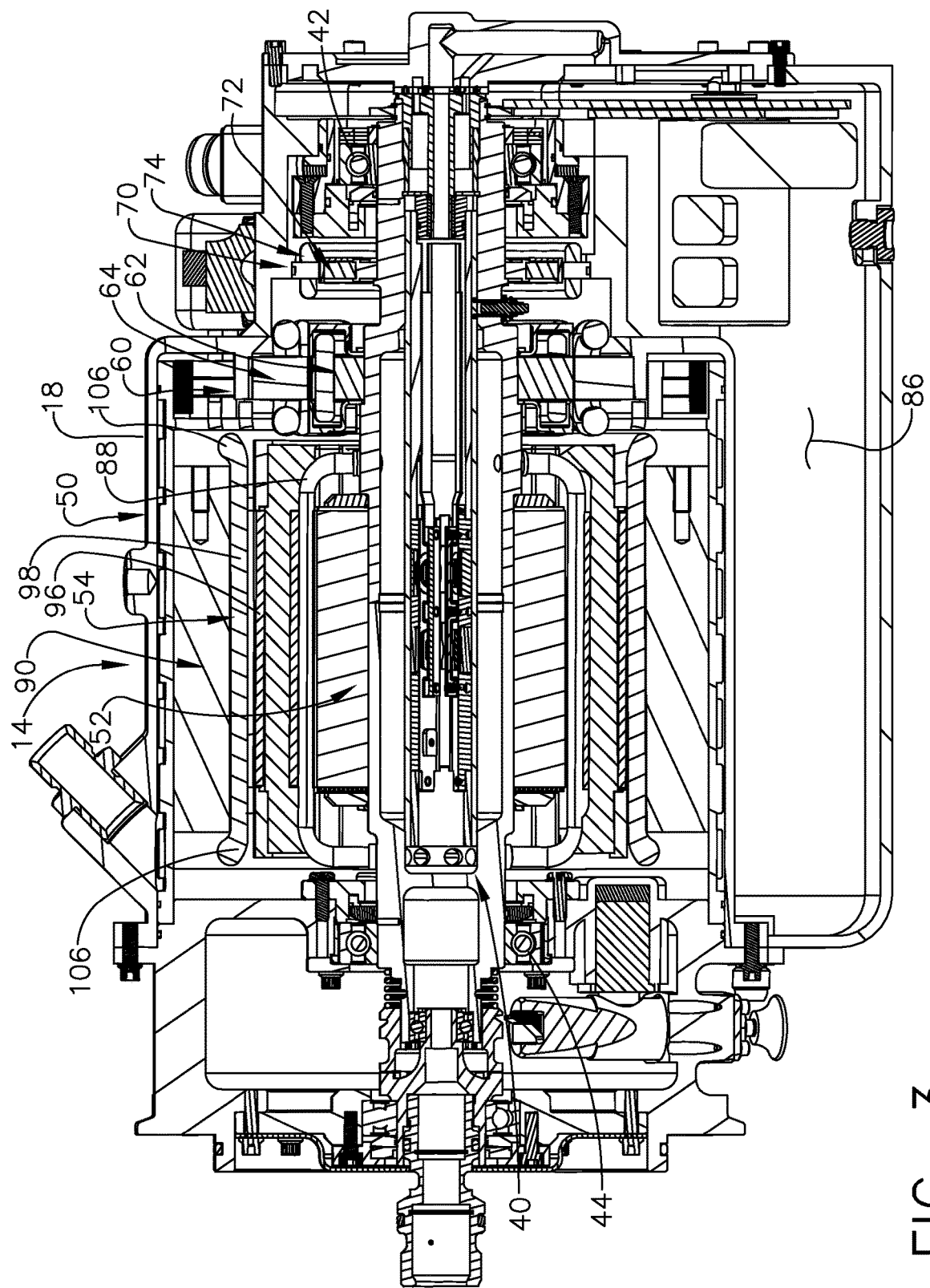
FIG. 3 is a schematic cross-sectional view of the generator of FIG. 2 having a main machine, exciter, and permanent magnet generator (PMG), in accordance with various aspects described herein.

A non-limiting example interior of the generator 14 is best seen in FIG. 3, which is a sectional view of the generator 14 of FIG. 2. A rotatable shaft 40 is located within the generator 14 and is the primary structure for supporting a variety of components. The diameter of the rotatable shaft 40 can be fixed or vary along the length of the rotatable shaft 40. The rotatable shaft 40 is supported by spaced bearings 42 and 44. Several of the components of the generator 14 have a fixed component and a rotating component, with the rotating component being provided on the rotatable shaft 40. Examples of these components can include a main machine 50, an exciter 60, and a PMG 70, with the corresponding rotating component comprising a main machine rotor 52, an exciter rotor 62, and a PMG rotor 72, respectively, and the corresponding fixed component comprising a main machine stator 54, an exciter stator 64, and a PMG stator 74. In this manner, the main machine rotor 52, exciter rotor 62, and PMG rotor 72 can include the rotatable shaft 40. The fixed components can be mounted to any suitable part of the housing 18. Each of the main machine stator 54, exciter stator 64, and PMG stator 74 defines an interior through which the rotatable shaft 40 extends.

It will be understood that each of the main machine rotor 52, exciter rotor 62, and PMG rotor 72 can have multiple rotor poles and that each of the main machine stator 54, exciter stator 64, and PMG stator 74 can have multiple stator poles such that magnetic fields can be produced by respective components. The generator 14 can, in turn, operably generate electrical power by way of rotation of the rotatable shaft 40 relative to the fixed components through the interaction of the magnetic fields and current-carrying conductors located in the rotating or fixed components. For example, in at least one rotor pole and stator pole can be formed by a core with a post and wire wound about the post to form a winding or set of windings, with the set of windings having at least one end turn It can be seen in FIG. 3 that the main machine stator 54 includes a stator core 90 having at least one post 96. A set of stator windings 98 are formed when a conductor or conductive wire is wound about the post 96. The set of windings 98 can also include a winding segment that extends across either the front or rear of the post 96, forming at least one end turn 106.

During power-generating operations, the rotatable rotor 40 is mechanically powered, driven, or rotated by a force, such as the mechanical energy of the engine 10. The relative rotational motion of the rotatable rotor 40 and co-rotating components, including at least the main machine rotor 52, relative to the fixed or stationary stator components, including at least the main machine stator 54, generates electrical power in the set of stator windings 98 due to the interaction of the generator 14 magnetic fields. The electrical power generated in the set of stator windings 98 can be conductively connected to the power connectors 24, 26 of the generator 14, where the power can be further delivered to at least one electrical load. In one non-limiting aspect, the generator 14 can provide the electrical power to a power distribution system or power distributed network.

Non-limiting aspects of the generator 14 can be any combination of known generators. For example, the main machine 50 can be either a synchronous or asynchronous generator. In addition to the aspects described herein, additional component, devices, or the like can be included to provide secondary generator 14 operations or functions. For instance, in one non-limiting aspect of the disclosure, the generator 14 can include electromechanical accessories, or other accessories driven from the rotation of the rotatable shaft 40, including but not limited to, an oil pump, a fluid compressor, a hydraulic pump, or the like.

Further non-limiting aspects of the generator 14 can further include oil cooling or an oil cooling system for controlling the supply of oil to the oil cooling system. The cooling oil can be used to dissipate heat generated by the electrical and mechanical functions of the generator 14. The oil system can also provide for lubrication of the generator 14.

In another non-limiting aspect of the disclosure, the generator 14 can be a liquid cooled, dry cavity system having an oil cooling system illustrated as including an oil reservoir 86 and various cooling passages 88 (only partially shown). The rotatable shaft 40 can provide oil flow paths for the main machine rotor 52, exciter rotor 62, and PMG rotor 72. In a dry cavity generator, no cooling oil is permitted to contact the insulation system used in the generator 14. This dry cavity approach improves reliability over typical wet cavity designs in which oil is permitted to contact nonmetallic materials, such as the generator insulation system. In the dry cavity approach, the insulation system is not degraded because there is no direct impingement of hot oil on the windings. The workings of an generator 14 having a liquid cooled, dry cavity system are known in the art, which includes the disclosure in U.S. Pat. No. 7,687,928, issued Mar. 30, 2010, entitled Dual-Structured Aircraft Engine Starter/Generator, which is incorporated herein by reference.

Figure 4:
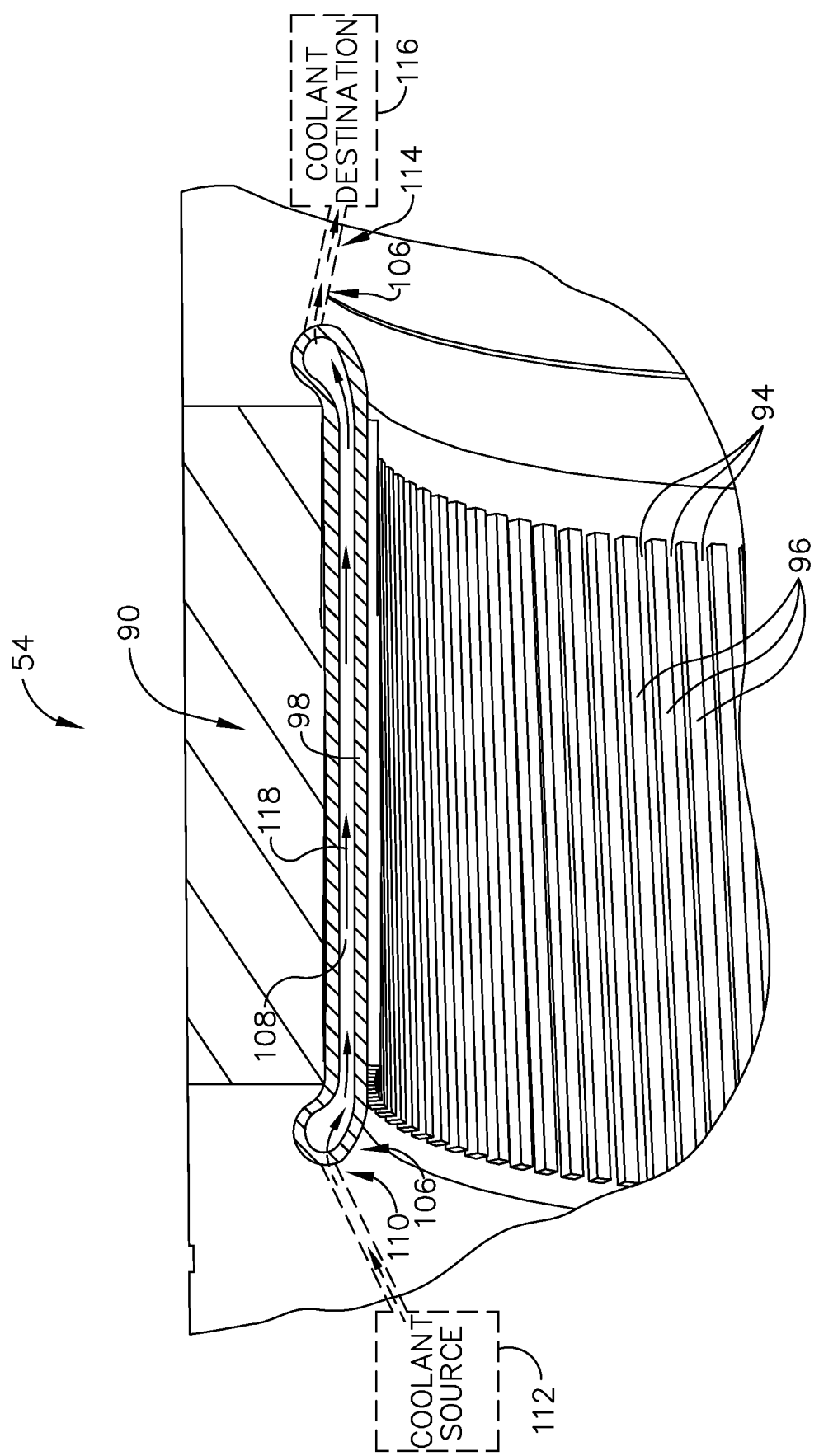
FIG. 4 is a sectional view of a portion of the main machine stator and set of stator windings of the generator of FIG. 2, in accordance with various aspects described herein.

FIG. 4 is a non-limiting cross-sectional view of the main machine stator 54, further illustrating the stator core 90, a set of stator posts 96 defining a corresponding set of winding slots 94 extending axially along the stator core 90, and the set of stator windings 98. The set of winding slots 94 can be sized, arranged, disposed, or the like to receive the set of stator windings 98. It will be understood that only a portion of the windings 98 have been shown and that another portion extends along the other side of the post 96.

As shown, the set of windings 98 can be at least partially hollow, that is, defining a fluid channel 108 that extends along the length and in the direction of the set of windings 98. Non-limiting aspects of the set of windings 98 can be included wherein the fluid channel 108 is entirely enclosed along the length of the set of windings 98 to, for example, ensure dry cavity generator 14 operation or configuration, or to prevent the coolant from escaping the fluid channel 108. At least a first end 110 of the set of windings 98 can be fluidly connected with a fluid coolant source 112, illustrated schematically. At least a second end 114 of the set of windings 98 can be fluidly connected a fluid coolant destination 116, also illustrated schematically. Aspects of the disclosure can be included wherein the first end 110 and the second end 114 are arranged to provide the respective coolant source 112 and coolant destination 116 contained fluid access to the fluid channel 108.

In this sense, the coolant source 112, the set of windings 98, and the coolant destination 116 can define a cooling flow path (illustrated via arrows 118), wherein a coolant can be pumped, provided, delivered, supplied, or the like, through the set of stator windings 98. Non-limiting aspects of the coolant can include any fluid, such as water, oil, air, compressed gas, or the like. In another non-limiting aspect, the coolant can include a dielectric coolant, or a non-electrically-conductive fluid. Additionally, while the illustrated example of FIG. 4 shows opposing first and second ends 110, 114 of the set of windings 98 connected with the respective coolant source 112 and coolant destination 116, non-limiting aspects of the disclosure can be included wherein a set of windings 98 includes the first and second ends 110, 114 on a common side of the stator core 90. For example, the set of stator windings 98 can be a continuous winding 98 received by multiple stator posts 96, and wherein the first and second ends 110, 114 can be terminally connected on a forward or aft side of the stator 54, relative to the stator core 90. In this non-limiting example, the coolant source 112 and coolant destination 116 can be connected with the respective ends 110, 114 on the same forward or aft side of the stator 54. In another non-limiting example of the disclosure, the coolant source 112 or coolant destination 116 can be disposed on opposing sides of the stator core 90 opposite of the illustrated example, while retaining the same functionality of allowing, enabling, or providing for a coolant flow path 118, as described.

During operation of the generator 14, the conduction of current along the set of windings 98 can generate heat in the set of windings 98. The effect of providing the fluid channel 108 to pump, force, or otherwise flow a coolant along the coolant flow path 118 can allow, provide for, or enable the transfer of heat or thermal energy from the set of windings 98 to the coolant or coolant flow path 118 in a dry cavity system. The coolant traversing the set of windings 98 can be further cooled by a cooling system and recirculated between the coolant source 112 and the coolant destination 116. In another non-limiting aspect, the coolant source 112 and the coolant destination 116 can be a common component, such as the oil reservoir 86, or form at least a portion of a coolant loop.

Figure 5:
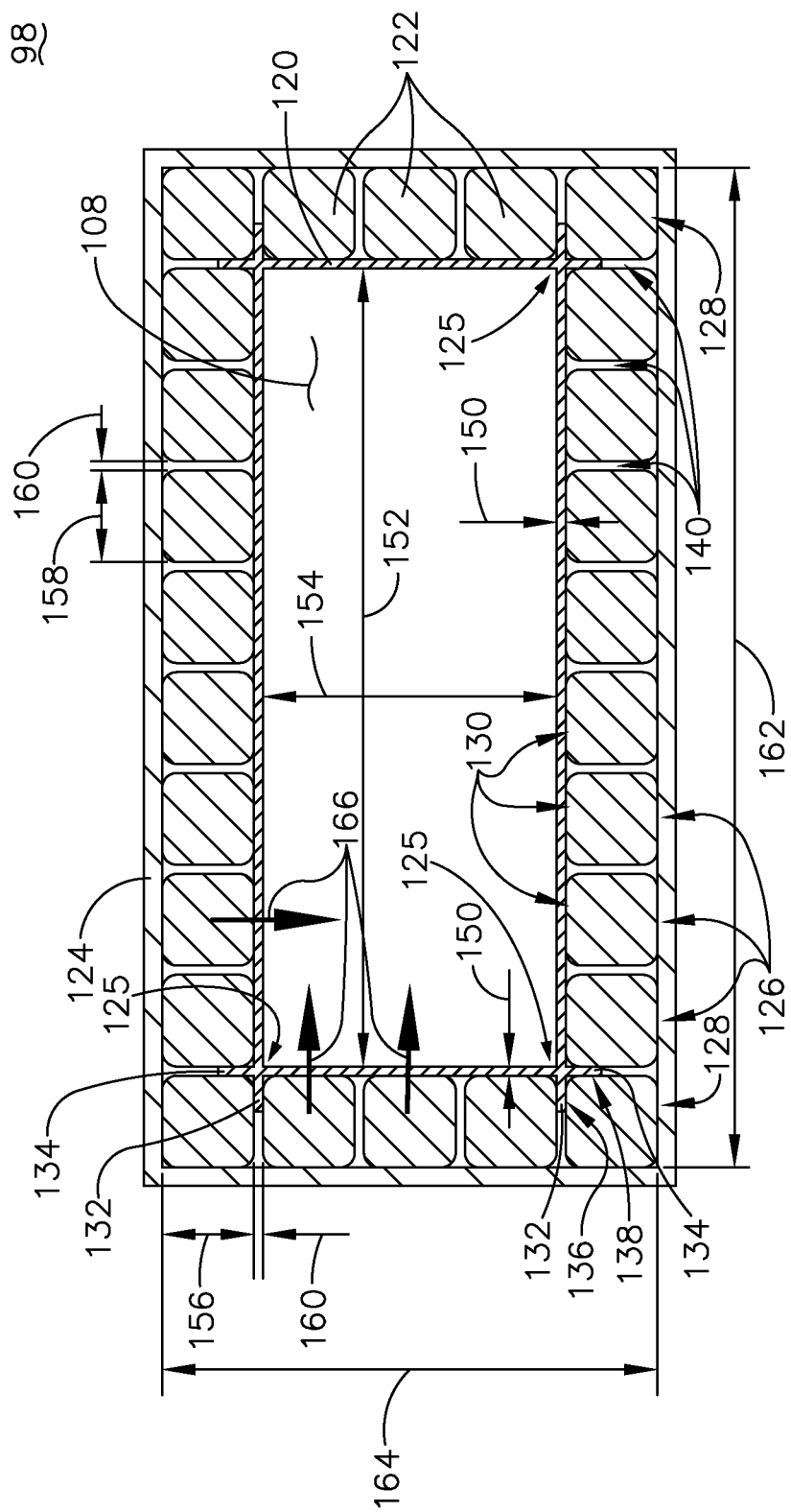
FIG. 5 is a sectional view of the set of stator windings of the generator of FIG. 2, in accordance with various aspects described herein.

FIG. 5 illustrates a non-limiting example cross section of the set of windings 98 described herein. As shown, the set of windings 98 can include a base conductor 120 defining the hollow fluid channel 108, and a set of solid conductors 122 arranged, disposed, located, or the like, about the perimeter of the base conductor 120. Non-limiting aspects of the set of windings 98 can further include a thermally conductive and electrically insulative layer 124 at least partially enclosing the base conductor 120 and the set of solid conductors 122. The thermally conductive and electrically insulative layer 124 can include any dielectric material to prevent conductive contact between at least one of the base conductor 120 or the set of solid conductors 122 and the stator core 90.

As shown, non-limiting aspects of the base conductor 120 can include a generally polygonal cross section, illustrated as, but not limited to, a rectangle. Additional non-limiting aspects of the base conductor 120 can include a generally polygonal cross section including at least one corner 125. Non-limiting aspects of the set of solid conductors 122 can include a substantially square cross sectional area. Additionally, non-limiting aspects of the set of solid conductors 122 can further include a first subset of solid conductors 126 positioned along a straight edge perimeter of the base conductor 120 and a second subset of corner solid conductors 128 positioned proximate to, or corresponding with the at least one corner 125 of the base conductor 120.

The first subset of solid conductors 126 can be positioned proximate to the perimeter of the base conductor 120 such that a substantial portion of at least one flat side or one surface 130 from at least one of the solid conductors 126 is in thermal contact with the base conductor 120. In this sense, the subset of solid conductors 126 is thermally connected, or thermally coupled with at least a portion of the outer perimeter of the base conductor 120. As used herein, a "substantial portion" of at least one surface 130 of at least one of the solid conductors 126 can include a majority of a continuous planar surface of the solid conductor 126. Non-limiting aspects of the disclosure can be included wherein, for example, the set of solid conductors 122 can be welded, brazenly connected, adhered with a thermally conductive material, or thermally connected by way of mechanical fasteners or bonders to the base conductor 120.

Further non-limiting aspects of the disclosure can be included wherein the base conductor 120 includes additional corner walls extending past the geometric perimeter of the base conductor 120 corners 125, shown as a first extending wall 132 and a second extending wall 134. At least one of the first or second extending walls 132, 134, or a combination thereof, can provide additional surface area for thermally contacting a respective first and second surfaces 136, 138 of a corresponding subset of the corner solid conductors 128. In this sense, the first or second extending walls 132, 134 ensure, enable, allow, or provide for a combined thermal interface with the first or second surfaces 136, 138 of the subset of corner solid conductors 128, such that the subset of corner solid conductors 128 are also in thermally connected, or thermally coupled with at least a portion of the base conductor 120. In this sense, aspects of the disclosure can be include where the set of solid conductors 122 are individually thermally connected with the base conductor 120 by at least one surface 130, 136, 138 such that heat generated in the set of solid conductors 122 can be thermally conducted or transferred (e.g. as illustrated by arrows 166 from the set of solid conductors 122 to the base conductor 120, and further from the base conductor 120 to coolant traversing the fluid channel 108. Non-limiting aspects of the disclosure can be included wherein thermal adhesive, surface to surface contact, or any number of assembly forms can be included to ensure the thermal contact or thermal conduction between the set of solid conductors 122 and the base conductor 120.

In one non-limiting aspect of the disclosure, each of the set of solid conductors 122 can include a substantially similar or the same construct, including but not limited to, material composition, cross-sectional geometric shape, or the like. In another non-limiting aspect of the disclosure, adjacent solid conductors 122 can have different relative cross-sectional geometric shapes, including but not limited to, rounding surfaces, trapezoidal, rectangular, triangular, or other polygonal cross sections. In yet another non-limiting aspect of the disclosure, adjacent solid conductors 122 can be positioned relative to each other to maintain a minimum spacing from one other, illustrated as a gap 140. In one non-limiting aspect of the disclosure, the gap 140 can be filled with an electrically non-conductive material, thermally conductive material, or a combination thereof. One non-limiting example of gap-filling material can include varnish, such as an electrically insulating and thermally conductive varnish.

Furthermore, while the set of solid conductors 122 are shown with rounded corners or edges, aspects of the disclosure can be included wherein straight edges are included. In another non-limiting aspect of the disclosure, the base conductor 120 and the set of solid conductors 122 can be formed from the same electrically conductive material, including but not limited to, copper. In yet another non-limiting aspect of the disclosure, the base conductor 120 and the set of solid conductors 122 can be manufactured or assembled by way of three-dimensional printing, additive manufacturing, or the like.

In one non-limiting aspect of the disclosure, the set of base conductor 120 walls cross-section can have a thickness 150 of approximately 0.0127 millimeters. In another non-limiting aspect of the disclosure, a first cross-section dimension 152 of the fluid channel 108 cross-section, as defined by the base conductor 120, can be approximately 3.81 millimeters, which a cross-sectional second dimension 154 of the fluid channel 108, normal to the first dimension 152, can be approximately 1.27 millimeters. In yet another non-limiting aspect of the disclosure, a first cross-section dimension or thickness 156 of a solid conductor can be approximately 0.48 millimeters. In yet another non-limiting aspect of the disclosure, a second cross-section dimension or thickness 158 of a solid conductor, normal to the first dimension 156 of the solid conductor, can be approximately 0.48 millimeters. In this sense, a solid conductor 122 can have a cross-sectional area less than or equal to approximately 0.24 micrometers squared.

In yet another non-limiting aspect of the disclosure, a dimension 160 of the gap 140 between adjacent solid conductors 122 can be approximately 0.025 millimeters. In yet another non-limiting aspect of the disclosure, a first total cross-sectional winding dimension 162 of the base conductor 120 and the set of solid conductors 122 can be approximately 5.05 millimeters, while a second total cross-sectional winding dimension 164 of the base conductor 120 and the set of solid conductors 122 can be approximately 2.5 millimeters. The aforementioned dimensions are merely one non-limiting example of a winding 98 cross-sectional configuration, and many other examples can be envisioned. For example, in one non-limiting instance, while additional or alternative dimensions may differ, ratios between respective elements or dimensions can remain consistent.

FIG. 3, illustrates another non-limiting example of a generator 214 having a set of windings as described herein. As shown, a rotatable shaft 240 is located within the generator 214 and is the primary structure for supporting a variety of components. The rotatable shaft 240 can have a single diameter or one that can vary along its length. The rotatable shaft 240 is supported by spaced bearings 242 and 244 and configured to rotate about axis of rotation 241. Several of the elements of the generator 214 have a fixed component and a rotating component, with the rotating component being provided on the rotatable shaft 240. Examples of these elements can include a main machine 250, housed within a main machine cavity 251, an exciter 260, and a permanent magnet generator (PMG) 270. The corresponding rotating component comprises a main machine rotor 252, an exciter rotor 262, and a PMG rotor 272, respectively, and the corresponding fixed component comprises a main machine stator 254 or stator core, an exciter stator 264, and a PMG stator 274.

As shown, aspects of the exciter 260, and the PMG 270 can be coplanar to a plane 222 orthogonal or perpendicular to the axis of rotation 241. In this sense, non-limiting aspects of the exciter 260, such as the exciter rotor 262 or exciter stator 264, or aspects of the PMG 270, such as the PMG rotor 272 or the PMG stator 274 can be coplanar at the orthogonal plane 222. Also as shown, the exciter 260, the exciter rotor 262, or the exciter stator 264 can be disposed along an outer radius of the PMG 270, the PMG rotor 272, or the PMG stator 274. Thus, the exciter 260 can be located radially outward from the PMG 270, relative to the axis of rotation 241.

While the illustrated aspects of the disclosure are shown wherein the exciter 260 and the PMG 270 components are co-located at the orthogonal plane 222, aspects of the disclosure can be included wherein the exciter 260 and the PMG 270 components are substantially coplanar with each other, or with a single orthogonal plane 222. Additional aspects of the disclosure can be included wherein aspects of the exciter 260 and the PMG 270 components are configured, arranged, disposed, or the like in a coplanar relationship wherein at least a portion of the exciter 260 or the PMG 270 axially overlaps the other component along the axis of rotation 241. Thus, "substantially coplanar" is not limited to a precise planar representation, and can include any overlapping between respective components 260, 270 along an axial segment.

The generator 214 can also include an arm 224 disposed on the rotatable shaft 240 and configured to co-rotate with the shaft 240. The arm 224 can also provide a mounting for at least one of the PMG rotor 272 or the exciter rotor 262. Non-limiting aspects of the disclosure can be included wherein another of the PMG rotor 272 or the exciter rotor 262 can be rotationally mounted directly to the rotatable shaft 240. In another non-limiting aspect of the disclosure both the PMG rotor 272 and the exciter rotor 262 can be rotationally mounted to the arm 224. The arm 224 can include a segment 226 extending radially away from the rotatable shaft 240 such that the arm 224 or the segment 226 has a larger radius, as measured from the axis of rotation 241, compared with the rotatable shaft 240. Non-limiting aspects of the disclosure can be included wherein the arm 224 or segment 226 can include a set of arms 224 or segments 226 that are radially spaced about the rotatable shaft 240. The set of arms 224 or segments 226 can be radially spaced based on a desired rotational balance between the exciter rotor 262, the PMG rotor 272, permanent magnets, a number of poles of the exciter rotor 262 or PMG rotor 272, the set of arms 224, the set of segments 226, or a combination thereof.

In another non-limiting aspect of the disclosure, the arm 224 or segment 226 can include a continuous arm 224 or segment 226, where the arm 224 or segment 226 extends continuously (e.g. without radial breaks or radial gaps) about the axis of rotation 241. In this non-limiting aspect of the disclosure, the exciter rotor poles, the PMG rotor poles, or permanent magnets can be disposed, arranged, radially spaced, or the like based on a desired rotational balance between the exciter rotor 262, the PMG rotor 272, permanent magnets, a number of poles of the exciter rotor 262 or PMG rotor 272, the arm 224, the segment 226, or a combination thereof.

While the illustrated example shows aspects of the exciter rotor 262, the exciter stator 264, the PMG rotor 272, and the PMG stator 274 are represented in the same cross-sectional view for ease of understanding, aspects of the disclosure can be included wherein the exciter rotor 262, the exciter stator 264, the PMG rotor 272, or the PMG stator 274 are radially offset from other components. For instance, in one non-limiting aspect, the PMG rotor 272 can be radially offset from the exciter rotor 262 to reduce, prevent, or eliminate magnetic interference between the respective components. In another non-limiting aspect of the disclosure, aspects of the exciter 260 or PMG 270 can be electromagnetically shielded from corresponding components, such as radially separating the exciter 260 from the PMG 270, to reduce, prevent, or eliminate magnetic interference between the respective components.

In this manner, the main machine rotor 252, exciter rotor 262, and PMG rotor 272 are disposed on, or rotationally supported by the rotatable shaft 240, such as directly by the shaft 240, or indirectly by the shaft 240, as in the aforementioned arm 224. The fixed components, such as the main machine stator 254, the exciter stator 264, or the PMG stator 274 can be mounted to any suitable part of the housing 218, such that relative rotation of the rotor components can electromechanically interact with the respective stator components 254, 264, 274. The main machine stator 254, exciter stator 264, and PMG stator 274 define an interior through which the rotatable shaft 240 extends.

It will be understood that the main machine rotor 252, exciter rotor 262, and PMG rotor 272 can have a set of rotor poles, including, but not limited to two rotor poles, and that the main machine stator 254, exciter stator 264, and PMG stator 274 can have a set of stator teeth or stator poles, including, but not limited to two stator teeth or stator poles. The set of rotor poles can generate a set of magnetic fields relative to the set of stator poles, such that the generator 214 can operate through the interaction of the magnetic fields and current-carrying conductors to generate force or electrical power. The exciter 260 can provide direct current to the main machine 250 and the main machine 250 and PMG 270 can supply AC electrical power when the rotatable shaft 240 rotates.

At least one of the rotor poles and stator teeth or stator poles can be formed by a core with a post and wire wound about the post to form a winding, with the winding having at least one end turn. Aspects of the disclosure shown include at least one set of stator windings 290 arranged longitudinally along the stator housing 218, that is, in parallel with housing 218 and the rotor axis of rotation 241. The set of stator windings 290 can also include a set of stator winding end turns 292 extending axially beyond opposing ends of a longitudinal length of a main machine stator 254. Aspects of the stator windings 292 can be similar to the windings described and illustrated in FIG. 5.

The components of the generator 214 can be any combination of known generators. For example, the main machine 250 can be either a synchronous or asynchronous generator. In addition to the accessories shown in this aspect, there can be other components that need to be operated for particular applications. For example, in addition to the electromechanical accessories shown, there can be other accessories driven from the same rotatable shaft 240 such as the liquid coolant pump, a fluid compressor, or a hydraulic pump.

Figure 6:
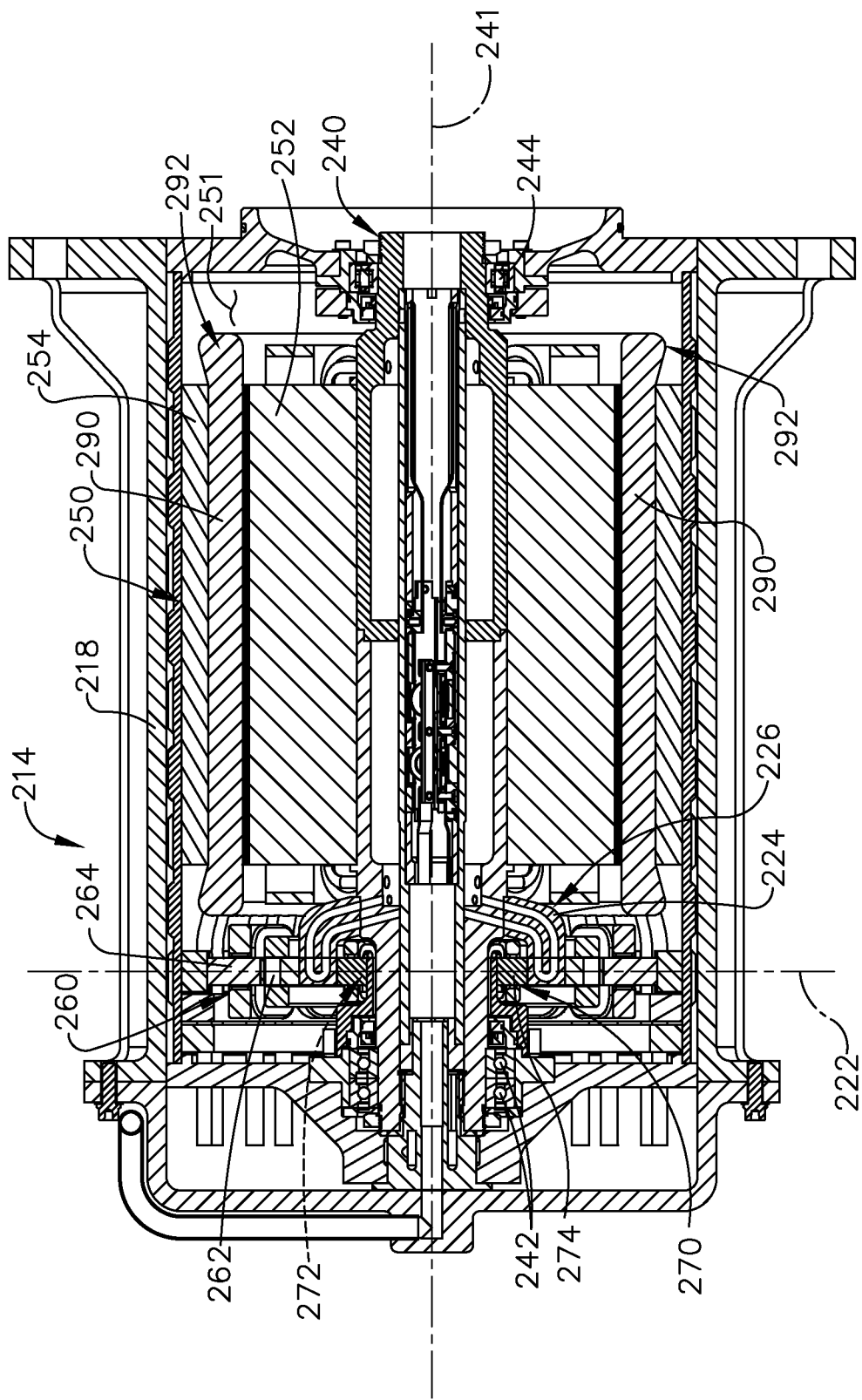
FIG. 6 is a schematic cross-sectional view of another generator, in accordance with various aspects described herein.
Figure 7:
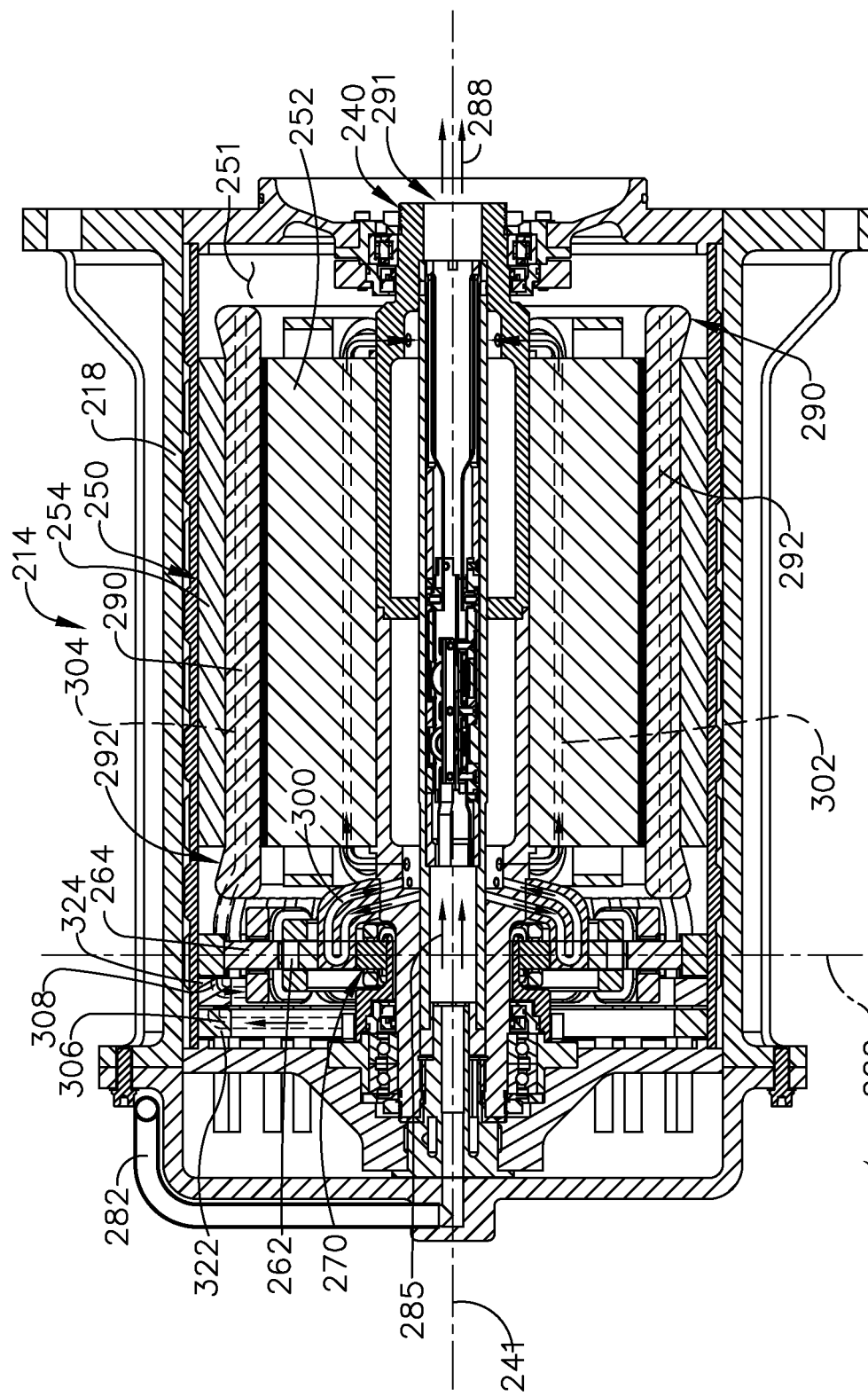
FIG. 7 is a schematic cross-sectional view of the generator of FIG. 6, illustrating the cooling system of the generator, in accordance with various aspects described herein.

As explained above, the generator 214 can be oil cooled and thus can include a cooling system. The cooling oil can be used to dissipate heat generated by the electrical and mechanical functions of the generator 214. FIG. 7 illustrates a non-limiting example cooling system 280. FIG. 7 illustrates a second sectional view, different from the sectional view of FIG. 6, to better illustrate aspects of the cooling system 280. In one example, aspects of the cooling system 280 can utilize oil based on, for instance, a desired cooling capability, a high specific heat, a high thermal capacity, or a desired viscosity (e.g. for pumping purposes). In another example, cooling oil can also provide for lubrication of the generator 214. In the illustrated aspects of the disclosure, the generator 214 can be a liquid cooled, dry cavity system having the cooling system 280 illustrated as including a cooling fluid inlet port 282 and a shaft outlet port 291 for controlling the supply of the cooling fluid to the cooling system 280.

The cooling system 280 can further include, for example, a cooling fluid reservoir and various cooling passages. The rotatable shaft 240 can provide one or more flow channels or paths for the main machine rotor 252, exciter rotor 262, and PMG rotor 272. In one non-limiting example aspect of the cooling system 280, the rotatable shaft 240 can define an interior 284 to receive a flow of cooling oil (shown as arrows 285), which can be further pumped, transported, delivered, or diverted to additional cooling passages. In another non-limiting aspect of the cooling system 280, the arm 224 or segment 226 can include a first cooling passage 300 disposed or arranged to carry a flow of cooling oil through the arm 224 or segment 226. The first cooling passage 300 can be operably configured to thermally receive heat generated in rotationally-supported components, including, but not limited to, the exciter rotor 262 the PMG rotor 272, or a combination thereof, and transfer the heat to the cooling oil for removal. In yet another non-limiting aspect of the cooling system 280, the main machine rotor 252 can include a second cooling passage 302 disposed or arranged to carry a flow of cooling oil through the main machine rotor 252. The second cooling passage 302 can be operably configured to thermally receive heat generated in the main machine rotor 252 and transfer the heat to the cooling oil for removal. Heated oil, Residual, unused, or unspent oil can be discharged from the rotatable shaft 240 can be provided to an outlet port, such as the rotor shaft oil outlet 288 or the shaft outlet port 291.

Non-limiting aspects of the disclosure can be included wherein the first or second cooling passages 300, 302 can be radially spaced about the rotatable shaft 240. The first or second cooling passages 300, 302 can be radially spaced based on a desired rotational balance, or a set of desired heat removal characteristics. For instance, in one non-limiting aspect, the first or second cooling passages 300, 302 can be disposed proximate to respective main machine 250, exciter 260, or PMG 270 heat-generating components to ensure reliable thermal coupling.

As shown, non-limiting aspects of the cooling system 280 can further include a cooling circuit for the set of stator windings 290 of the main machine stator 254. For instance, at least one set of stator windings 290 can be wound about the main machine stator 254.

A problem with conventional wet or dry cavity generators is that conventional cooling system have difficultly removing heat generated by at least one of the main machine stator or the set of stator windings disposed or located closer to the axial center of the stator. Heat retained proximate to the axial center of the main machine stator or the set of stator windings can result in reduced generator performance or output. Unwanted heat can be caused by, for example, stator core losses due to hysteresis or eddy currents generated during generator operations. In on non-limiting example, conventional generators can address this problem by including a low thermal conductive layer (e.g. approximately 0.12 Watts per degree Celsius-meter; "W/mC") between the stator and stator windings to thermally conduct a small portion of heat away from the stator to the windings, while an external cooling jacket thermally conducts the majority of heat away from the stator. A conventional external cooling jacket includes coolant passages encircling at least a portion of the main machine stator, wherein the jacket coolant passages are fluidly coupled with a liquid coolant source. The liquid coolant traversing the cooling jacket provides cooling to ensure desired generator operation, but the addition of cooling systems increases the costs, complexity, and adds to the weight and size requirements of the generator system.

Aspects of the disclosure provide an alternative solution to address cooling problem of at least the main machine stator 254, the set of stator windings 290, or a combination thereof, by using a specialized configuration of main machine stator windings 290 including a third cooling passage 304 disposed through the windings 290, similar to FIG. 5 herein, and configured to carry a flow of cooling oil through at least a subset of the stator windings 290. The third cooling passage 304 can be operably configured to thermally receive heat generated in the main machine stator 254 or the set of stator windings 290 and transfer the heat to the cooling oil for removal. In one non-limiting aspect, a first end of the set of stator windings or the third cooling passage 304 can be fluidly connected with the oil flow by, for example, a stator windings coolant inlet housing 322 defining an inlet passage 306, connected with the at least subset of stator windings 290 axially past the stator winding end turns 292. Heated oil, Residual, unused, or unspent oil can be discharged from the at least subset of stator windings 290 by way of a stator windings coolant outlet housing 324 defining an outlet passage 308, which, for example, can also be located axially past the stator winding end turns 292. The stator windings outlet passage 308 can be further connected with an oil outlet port for the generator 214, such as the rotor shaft oil outlet 88 or the shaft outlet port 291. Aspects of the disclosure can be included wherein the coolant inlet housing 322 and the coolant outlet housing 324 are axially spaced from one another. At least one of the coolant inlet housing 322 or the coolant outlet housing 324 can be of the form of a pancake or ring configuration, relative to the axis of rotation 241.

While the set of stator windings 290 are schematically shown, multiple sets of stator windings 290, or multiple sets of stator windings 290 per stator core slot can be included. For instance, in one non-limiting example, at least two sets of stator windings 290 can be stacked, layered, embedded, installed, or wound about a stator core slots. Non-limiting aspects of the disclosure can also be included wherein at least a subset of the stator windings 290 can include an external layer of electrically insulating material to electrically isolate the set of stator windings 290 from another set of stator windings 290 or the main machine stator 254 or stator core.

FIG. 8 illustrates one non-limiting example aspect of the stator windings 98, 290 and third cooling passage 304. As shown, at least a subset of the stator windings 290 includes a first end 326 of the windings 290 and an opposing second end 328 of the windings 290. The at least one subset of the stator windings 290 can pass through or proximate to at least one of the stator windings inlet housing 322 or coolant outlet housing 324. At least one of the stator windings inlet housing 322 or the coolant outlet housing 324 can also include a center bore 320 or through-hole configured to receive or match the rotatable shaft (not shown). Non-limiting aspects of the disclosure can be included wherein at least one of the stator windings inlet passage 306 or the coolant outlet passage 308 can be fluidly connected with the rotatable shaft coolant flow, described herein. In another instance of the non-limiting example shown, the first end 326 of a subset of stator windings 290 can extend through or proximate to the stator windings inlet housing 322 and the coolant outlet housing 324, and connect to an electrical terminal or power output of the generator 214. In a first example, the stator winding 290 can be fluidly connected with the stator windings inlet passage 306 by, for instance, an aperture 312 to fluidly receive the coolant (illustrated with cross section of the coolant inlet housing 322 removed to schematically show the inlet passage 306 as an arrow, and traversing toward the main machine stator). In this first example, the stator winding 290 can pass through the coolant outlet housing 324 via a through channel 310 not fluidly connected with the coolant outlet passage 308.

In another example, a different stator winding 290 segment can be fluidly connected with the stator windings coolant outlet passage 308 by, for instance, an aperture 312 to fluidly provide heated coolant from the main machine stator to the coolant outlet passage 308 (again, illustrated with cross section of the coolant outlet housing 324 removed to schematically illustrated the outlet passage 308 as an arrow). In this other example, the stator winding 290 can pass through the coolant inlet housing 322 via a through channel 310 not fluidly connected with the coolant inlet housing 322. As used herein, "heated coolant" can convey that the coolant is removing or has removed heat from an upstream component. The coolant inlet passage 306 and coolant outlet passage 308 can be further fluidly connected to a coolant circuit or coolant reservoir.

During power-generating operations, the rotation of the rotatable shaft 240 relative to the stationary generator 214 components ultimately induces generates current in the main machine stator windings 290, which is further provided to a generator power outlet, which it can be supplied to power or energize a set of electrical loads. Specifically, the rotation of the exciter rotor 262 relative to the exciter stator 264, the rotation of the PMG rotor 272 relative to the PMG stator 274, and the rotation of the main machine rotor 252 relative to the main machine stator 254 will generate heat due to heat losses, copper losses, resistive losses, winding losses, or the like, as the current traverses the respective resistive windings. In addition to the winding losses, the aforementioned components 252, 254, 262, 264, 272, 274 can generate or retain unwanted heat due to, for example, core losses due to hysteresis or eddy currents, as explained herein. For instance, as explained above, the main machine stator 254 heat can be generated or retained away from the axial ends of the stator 254.

The cooling systems 280 can enable or provide dry cavity-based cooling by way of at least the first, second, and third cooling passages 300, 302, 304, or a subset thereof, to thermally transfer heat from the heated components to the cooling liquid, such as cooling oil. In this sense, the heat generated in the respective components can be conductively transferred to the cooling liquid (i.e. "hot" liquid) of the cooling system 280, which can be forcibly pumped away from the heat-generating components.

The aforementioned aspects of the disclosure enable or provide a generator 214 having increased cooling capabilities over contemporary generators. Since aspects of the disclosure significantly increase the main machine stator 254 or set of stator windings 290 cooling capability, as well as the cooling capability of the PMG rotor 272, the exciter rotor 262, or a combination thereof, the generator 214 can be designed or operated without, or free of, additional cooling systems external to the generator 214, other than the cooling system 280 described herein. For example, aspects of the disclosure can provide for a dry cavity generator 214 wherein the system can be designed or operated without, or free of, at least an external liquid cooling jacket such that the system provides cooling greater than or equal to a predetermined level, wherein the predetermined level is based on an external liquid cooling jacket. Alternatively, or in addition to the aforementioned benefit, the above-described aspects enable or provide a generator 214 that operate at a higher power density, or generate increased power levels, without a loss in power-generation efficiency due to undesirable heating.

Operating the cooling system 280 to enable or provide increased cooling capabilities, and thus higher power generation operating capability, further enables or provides for a generator 214 having a higher overall power density compared with a conventional electrical machine wherein the exciter and PMG are arranged in series or sequentially along the axial direction of the rotational axis, or a compared with a conventional electric machine without stator windings as described herein. When combined the generator 214 can have a power density equal to or greater than double that of a conventional electric machine. In one non-limiting example the generator 214 described herein can generate at least 1 megawatt of electrical power utilizing the aspects described herein.

Many other possible aspects and configurations in addition to that shown in the above figures are contemplated by the present disclosure. For example, while the illustrated example describes a set of stator windings, aspects of the disclosure can be included in any set of generator windings (e.g. stator, rotor, exciter, PMG, etc.) or any current-carrying wire or conductor.

In aspects of the disclosure described herein, the hollow conductor cooling path can allow for, enable, or provide for removal of heat generated in the set of windings, due to for example, copper losses or eddy current losses in the winding conductors. In this sense, the set of solid conductors 122 will effectively carry the collective majority of current in the set of windings 98, compared with the base conductor 120. In one non-limiting example, "skin effect" results in current traversing the set of windings to tend toward the outer surfaces of the overall wire or windings. Heat generated in the set of solid conductors 122 can be effectively thermally conducted to the base conductor 120, which can be further conducted to the coolant traversing the fluid channel 108.

One advantage of the aspects disclosed herein allows for a set of windings configured or arranged such that coolant can remove heat from the windings during generator operations. In generators where alternating current (AC) power is being generated in the windings, a single, larger hollow wire can have significant (e.g. several multiples) higher power losses than the corresponding direct current (DC) power losses at similar operating frequencies. Higher power losses mean less efficiency, and lower power ratings for the generator. Aspects of the above described disclosure wherein the inner wire, the base conductor carry a small portion of the current because the base conductor is small compared with the set of solid conductors, and because of the skin effect, and as a result, aspects of the disclosure have fewer AC losses in the base conductor compared with conventional solid or hollow windings.

Another advantage of the disclosure can include more efficient power generation due to fewer AC losses in the windings, while allowing for better cooling due to the fluid channel construction. Furthermore, the spacing between the solid conductor reduces AC losses compared with solid wiring, yet does not reduce the overall electrical conductivity of the windings. Yet another advantage of the described aspects can be that the sets of windings can be "printed" using additive manufacturing in bulk, or in specialized dimensions, configurations, angling, cross-sectional dimensions, or the like, depending on the desired operating characteristics or desired form factors.

To the extent not already described, the different features and structures of the various aspects can be used in combination with each other as desired. That one feature cannot be illustrated in all of the figures or aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A conductor, comprising:
   a hollow base conductor defining a fluid channel along the base conductor; and
   a set of solid conductors arranged about a perimeter of the hollow base conductor;
   wherein the hollow base conductor has a polygonal cross section defining at least one corner, and at least one corner wall extending past the perimeter of the at least one corner.

2. The conductor of claim 1 wherein the conductor is a set of windings for an electric machine.

3. The conductor of claim 2 wherein the set of windings is a set of stator windings.

4. The conductor of claim 1 wherein the set of solid conductors are in thermal contact with the hollow base conductor.

5. The conductor of claim 4 wherein at least a subset of the set of solid conductors have a polygonal cross section defining at least one flat side.

6. The conductor of claim 5 wherein the at least one flat side is in thermal contact with the hollow base conductor.

7. The conductor of claim 1 wherein the set of solid conductors are connected with the hollow base conductor.

8. The conductor of claim 7 wherein the set of solid conductors further include a set of corner solid conductors positioned about the perimeter of the hollow base conductor proximate to the at least one corner of the hollow base conductor.

9. The conductor of claim 8 wherein the at least one corner wall is in thermal contact with at least one surface of at least one of the set of corner solid conductors.

10. The conductor of claim 1 wherein the set of solid conductors are spaced from one another along the perimeter.

11. The conductor of claim 10 further including a non-conductive varnish disposed between adjacent solid conductors.

12. The conductor of claim 1 wherein the hollow base conductor has a substantially rectangular cross section.

13. The conductor of claim 1 wherein the set of solid conductors have substantially square cross sections.

14. A set of windings for an electric machine, comprising:
    a polygonal cross-sectional base conductor having a set of sidewalls arranged to define at least one corner, and further defining a fluid channel, the base conductor including at least one corner wall extending past the perimeter of the at least one corner; and
    a set of polygonal cross-sectional solid conductors arranged about a perimeter of the base conductor and thermally connected with the base conductor.

15. The set of windings of claim 14, wherein the set of windings is arranged to connect with a coolant fluid source.

16. The set of windings of claim 14 wherein the set of solid conductors include at least one flat side in thermal contact with the base conductor.

17. A method of forming a set of electric machine windings, the method comprising:
- forming a polygonal cross-sectional base conductor having a set of sidewalls defining a fluid channel and at least one corner, and further comprising least one corner wall extending past the perimeter of the at least one corner; and
- arranging a set of polygonal cross-sectional solid conductors about a perimeter of the base conductor, wherein the set of solid conductors are thermally connected with the base conductor.

18. The method of claim 17 wherein the forming and the arranging are by way of additive manufacturing.

19. The method of claim 17, further comprising arranging a gap between adjacent solid conductors; and disposing a dielectric material in the gap.

\* \* \* \* \*